United States Patent Office 3,563,952
Patented Feb. 16, 1971

3,563,952
NOVOLAK MOLDING COMPOUNDS CONTAINING HEXAMETHYLENETETRAMINE MONOMETABORATE
Kurt Schmoll, Hangelar-Niederberg, Germany
No Drawing. Continuation of application Ser. No. 627,248, Mar. 23, 1969. This application Sept. 26, 1969, Ser. No. 861,515
Claims priority, application Germany, Mar. 24, 1966, D 49,680
Int. Cl. C08g 5/06, 51/18
U.S. Cl. 260—59          4 Claims

ABSTRACT OF THE DISCLOSURE

Manufacture of rapidly hardening phenol formaldehyde resin molding compositons having improved thermal stability and good flow characteristics by incorporating into the molding compositions hexamethylenetetramine in the form of a metaboric acid addition product. The resulting molding composition is then rolled and ground to produce the molding composition of improved properties.

---

This application is a continuation of application Ser. No. 627,248, filed Mar. 23, 1967, now abandoned.

This invention relates to phenol formaldehyde resin molding compositions and more particularly to a method for improving the thermal stability and flow characteristics of such compositions.

The behavior of thermosetting resin molding compositions in the course of the molding process is characterized by the fact that first they soften under the simultaneous effect of heat and pressure and assume the shape of the mold, and then they harden into solid molded articles or objects which can be stripped from the mold while still hot.

The proper preheating and thorough preplastification of molding compositions of this type offers advantages which are well known, such as a substantial reduction of the hardening time and with it an increase in press output; also, lower pressures are required, molds and dies last longer; and further the quality of the molded articles is improved.

The recognition and achievement of the foregoing was enhanced by the introduction of the injection molding process, due to the fact that, in this procedure, not only are the molding compounds preheated, but in passing through the gates and sprues of the injection mold they are exposed to additionl heating due to external and internal friction. In this procedure, therefore, the thermal stability of the thermosetting material used is of the utmost importance.

Furthermore, the thermal stability of molding compositions is important particularly in the lastest thermosetting plastic molding methods, such as injection molding with the preplastification being effected by screws, screw injection molding, and the like, and has a great influence on the output capacity of the machines.

In connection with the manufacturing methods last named, those molding compositions are accordingly to be preferred which can be transported i.e., moved continuously in the relatively low-viscosity, preplastified state under the influence of the screw temperature and screw propulsion, without any appreciable diminution of the mass flow taking place, which represents a well known sign of a premature hardening reaction. On the other hand, after its penetration into the mold, the preplastified mass should start to harden rapidly under the temperature conditions prevailing therein, and in a short time, it should produce a high degree of hardness in the molded body.

This invention has as an object a simple and practical method for producing thermally stable molding compositions characterized by excellent flow characteristics during processing.

A further object is a method for this puprose, applicable to the treatment of phenol formaldehyde molding compositions.

A still further object is a method for treating phenol formaldehyde molding compositions which, in addition to the above-mentioned modification of properties, confers on the compositions other valuable characteristics.

Other objects will appear hereinafter.

These objects are accomplished according to the invention by intimately blending a phenol formaldehyde molding compound with hexamethylenetetramine in the form of its metaboric acid addition product. Thus it has now been found, according to the invention, that the technical requirements for phenol formaldehyde molding compositions containing hexamethylenetetramine, as for example, those prepared on a basis of novolak, can be realized if the hexamethylenetetramine is used in the molding compounds, not in free form, but wholly or partially in the form of a metaboric acid addition product. Of the known mono-, di- and trimetaborates of hexamethylenetetramine, the use of monometaborate is preferred and of greatest importance in the manufacture of thermally more stable and extremely soft readily flowing molding compounds suitable for the type of use described above.

It has been described in the art to manufacture the monometaborate of hexamethylenetetramine, for example, by mixing hexamethylenetetramine and boric acid together in a molar ratio, the water which is liberated in the reaction being eliminated by drying at 60 to 70° C.

The hexamethylenetetramine monometaborate thus produced is sufficiently thermally stable, and it is not until a temperature of more than about 120° C. is reached that the hexamethylenetetramine is released in the form in which it is needed for accomplishing the hardening of the phenolic resin molding compositions prepared, for example, on a basis of novolak.

The most important and most often used kind of novolak base molding compositions contain mostly wood flour as a filler. In order to prepare the same, the coarsely crushed novolak is mixed with approximately the same quantity of wood flour, and also with hexamethylenetetramine (using about 15% of the quantity of the solid resin) and small amounts of lubricants, dyes and pigments, and, if desired, plasticizers, parting agents and other known types of fillers. The resulting batch mixture is then hot-compressed, preferably by means of rollers, the material being removed, after indicated periods of rolling time, in the form of a sheet which is then cooled and granulated or ground to a powder.

In accordance with the invention, the known prior art manufacturing process is modified by replacing the hexamethylenetetramine portion of the batch mixture with the equivalent amount of hexamethylenetetramine monometaborate, or other boric acid addition product. The use of the boric acid addition product instead of the hexamethylenetetramine which has been used hitherto in free form, results in a lasting high degree of plastification of the product from the mixing rolls, for example, when the batches are prepared on a hot roller mixer whose temperatures are usually around 100° C., and hence below the thermal stability limit of the boric acid addition compound, and even in the event of longer than normal rolling times, a molding composition can be produced, which after cooling, has excellent flow characteristics.

It is an advantage of the process of the invention that the manufacture of extremely soft flowing molding compositions can be carried out at normal rolling temperatures, substantially independently of the rolling time and hence with great safety. This is due to the fact that the hexamethylenetetramine, because of its thermally stable bond to boric acid, is unable to initiate an excessive further condensation of the novolak during the rolling process, and thus cannot cause a premature diminution of the flow characteristics of the molding compositions.

The result of this improved thermal stability of the molding compositions according to the invention, in which the hexamethylenetetramine is wholly or partially bound chemically to boric acid, is that, particularly in mass production operations, the preheating and preplastification of these compounds can be conducted under more favorable conditions of time and temperature without substantially any loss of the flow ability of the compound, thereby permitting a relatively greater temperature influence whereby an improved degree of plastification can be achieved, which is desirable in injection molding and injection pressing of thermosetting plastics.

Another advantage of the molding compositions according to the invention consists in the fact that they are characterized by a high setting speed, even in an extremely soft flow adjustment. The property is due to the fact that the quantity of hexamethylenetetramine is not reduced during the process of the hot rolling of the molding composition batches containing the boric acid addition products, and thus it is fully available for hardening under the conditions existant in the press. Excellent surface quality, high gloss and good resistance to boiling water, which are all found in the articles manufactured from the molding compositions prepared according to the invention, are the indication of a high degree of hardening.

Using the hexamethylenetetramine in the form of its metaborate as a component of the molding compound brings the additional advantage that the manufactured articles have good physical properties, and particularly, a high Martens stability of shape when hot (Standard DIN 53,458).

The following example will further illustrate this invention and how the same is to be carried out in practice, but the invention is not restricted to these examples. The parts are by weight.

EXAMPLE 1

140 parts of hexamethylenetetramine were thoroughly admixed with 62 parts of boric acid and the resulting product then dried at temperatures of 60–70° C.

370 parts of coarsely ground novolak were mixed with 455 parts of wood flour, 83 parts of hexamethylenetetramine metaborate, 15 parts of magnesium oxide, 15 parts of calcium oxide, 10 parts of zinc stearate, 20 parts of asbestos flour and 40 parts of colorant additives. The resulting batch of molding compound was then rolled for 2 to 3 minutes on rollers which were heated to 70 to 90° C. and which had a roller lag ratio of 19:23. The sheet thus produced appeared to be of good quality, and after cooling, it was ground to form a fine granular molding compound. This molding compound had a flowing capacity of 75 mm./15 sec., as determined using a Zwick apparatus (temperature: 167° C., pressure: 72 kp., flow passage: 3.2 mm. diam.; size of tablets: 9.6 mm. diameter, 11.5 mm. high). Even when the aforesaid rolling time was doubled, the compound retained its extremely soft-flowing quality.

In the following comparative tests, a molding compound was used which contained the equivalent amount of hexamethylenetetramine in free form instead of the metaborate compound. The compositions being compared were tested for their flow ability in relation to warm storage conditions, in order to evaluate their thermal stability. The temperatures manifested in the course of the heat treatment time were measured with thermocouples imbedded directly in the compositions. In the table which follows, wherein the results of the experiments are summarized, the borate free molding composition is referred to as Compound A, and the one containing borate as Compound B.

TABLE I

| Warm storage | | Flow ability (mm./sec.) | |
| --- | --- | --- | --- |
| Time (min.): | Temp. (° C.) | Compound A | Compound B |
| 0 | | 77/20 | 75/15 |
| 25 | 100 | | |
| 40 | 110 | | |
| 60 | 110 | 42/36 | 72/15 |
| 90 | 110 | 36/38 | 67/27 |
| 120 | 110 | 32/40 | 61/32 |
| 180 | 110 | 29/42 | 56/35 |

As can be seen from the above experimental data, the molding compound containing borate had a substantially greater stability than did the compound containing hexamethylenetetramine in free form. Accordingly, a more intense thermal pretreatment is possible when working with the compound containing the hexamethylenetetramine borate. Particularly, in the viscosity adjustment, which is advantageous for the preplastification, the compound A has good stability, because even at 115–120° C., the loss of flowing ability and of viscosity as well as the onset of premature hardening is greatly retarded in comparison with the molding compounds of the prior art. (Containing free hexamethylenetetramine.)

Under pressing conditions, the molding compound containing borate has a high speed of hardening. When 5 mm. thick hemispheres were pressed at a press pressure 360 kp./cm.$^2$, and at pressing temperatures of 160° C., well hardened and boiling water resistant articles were obtained in 1.5 minutes; at temperatures of 170° C., in 1.25 minutes, and at 180° C., in 1.0 minute.

The thermal stability of a shaped body measured on standard samples, according to DIN 53,458, ranged from 138 to 145° C. in the case of the borated molding compounds, while in the borate-free compound Martens values of only 125–130° C. were found.

Table 2 shown below represents four additional examples which explain the manufacture of phenol formaldehyde resin molding compositions containing as filler wood flour (Examples 2 and 3), asbestos (Example 4) and textile chads (Example 5). Example 2 represents phenol formaldehyde resin molding compositions filled with wood flour in the colors electro brown (designation: type 31/1478 according to DIN 7708) and black (designation: type 31/1449 according to DIN 7708). Example 3 shows an electro brown colored molding composition filled with wood flour containing a compound of free hexa and hexa metaboric acid adduct. With all other examples hexa metaboric acid adduct (mole ratio 1:1) is used instead of the otherwise used free hexamethylenetetramine. Examples 2–5 compare the test results of the adduct containing compounds (compound B) with those of adduct free products (compound A) which contains the corresponding quantity of free hexa.

The molding compositions named in Examples 2–5 are manufactured by a procedure analogous to that of Example 1. The mentioned molding composition components are compounded and then rolled on rollers which are heated to a temperature ranging from a low of about 60 to 70° C. up to about 90 to 110° C. The sheets thus produced were ground after cooling into a fine granular molding compound.

For measuring the flowability of the compounds in relation to of their warm storage (test for thermal stability under preheating conditions, for example at 110° C.) for compounds made according to Examples 2–4 the arrangement of a Zwick apparatus as per Example 1 is used. For testing the flowability of chads containing molding compositions as per Example 5, it is necessary to use in the Zwick apparatus a tool with a flow passage having a more extended cross section. Generally the following Zwick arrangement and test conditions are usual which are used in Example 5.

Cross section of the flow passage—10×4 mm.
Height of the flow passage—170 mm.
 Pressure—140 kp.
 Temperature—165° C.
Tablet diameter—30 mm.
Tablet pressure—100 kp.
Tablet height—approx. 13 mm.
Original weight in quantity of the compound—9 g.

On the basis of this alteration of the testing conditions the testing results are, of course, only comparable within example 5 and cannot be compared in their absolute values with the test results of Examples 1–4.

The warm storage tests of the compounds as per Examples 2–5 are executed (by taking into account the heating time of the samples) according to the description of Example 1.

Hexa adducts of boric acid, as for inst. di- and trimetaborates, can also be used in molding compositions instead of monoborate. Comparative experiments however, have shown that the molding compositions containing hexa monometaborate can be made more simple and show more favorable results in manufacturing, also as per the maintenance of their good flowability under preheating conditions.

The usual resin hexa weight ratio for molding compositions in the range of 100:12–19, preferably 100:15–18. In Examples 1–5 these values are in the sequence as follows: 100:17.1; 100:18.7; 100:17.4; 100.17.1; 100:15.1; 100:15.2.

Often phenolic resin molding compositions filled with wood flour are preferred and are made in quantities having a resin content of—in most cases—35–50 weight percent, referred to the total compound.

Asbestos as filler is less absorptive than organic fillers. Phenolic molding compositions filled with asbestos have lower resin contents. Nearly without any exception the resin proportion of these compounds filled with asbestos is 30–35 weight percent, referred to the total compound, corresponding the indications made in Example 4.

Textile filled phenol resin molding compositions generally have 40–50 weight percent of resin content, referred to the total compound as per Example 5 depending on the kind of the filler and their structure.

The hexa boric acid addition compounds can be used in molding compositions—independent of their kind of filler, the kind of lubricant and color compositions—which contain as molding composition binder a novolak resin for the hardening of which the hexamethylenetetramine is necessary. As per the invention with such molding compositions on novolak basis the hexamethylenetetramine totally or partially is replaced by the hexametaboric acid adduct.

Additives of plasticizer in adduct containing molding compositions are not necessary as the hexa metaboric acid adduct has the effectiveness of a plasticizer by itself. An adduct addition of only 0.5 weight percent, referred to the total compound, already causes a high flowability of the thermosetting material.

As molding compound agents there are used from the group of phenol resins the novolaks and resols. The novolaks are obtained by the condensation of phenol with less than molar quantities of formaldehyde under the use of acid condensation agents. They are meltable and soluble in certain organic solvents and do not undergo self-hardening. The hardening of the novolaks only can be made by addition of a hardening agent in the form of hexamethylenetetramine.

For manufacturing resols the phenol formaldehyde condensation is carried out in the manner that at least one mole, often a greater quantity of formaldehyde, is reacted with at least one mole phenol in the presence of alkaline catalysts.

The difference between the resols and novolaks is that the resols condensate continuously with heating without any addition of hardener. The result is that there are uncovered unmeltable and insoluble products, the so-called resists.

The use of hexa metaboric acid adducts is especially recommended for that kind of molding compositions which contain as main binder novolaks and hexamethylenetetramine components as latent hardening agents.

The properties of the products as per the invention do not only entirely correspond to DIN 7708 requirements (DIN=German Standards), but are even higher. Experience has shown that especially the dimensional stability as per Martens, the flexural strength and the impact strength (notched and unnotched) are generally noticeably higher than required by DIN 7708. Particularly low shrinkage values are another favorable point.

TABLE II

|  | Example 2 | | Example 3 | | Example 4 | | Example 5 | |
|---|---|---|---|---|---|---|---|---|
|  | Compound A | Compound B | Compound A | Compound B | Compound A | Compound B | Compound A | Compound B |
| Novolak | 38.0 | 38.0 | 37.0 | 37.0 | 33.3 | 33.3 | 46.9 | 46.9 |
| Hexa | 7.1 | | 6.45 | 3.15 | 5.7 | | 7.1 | |
| Hexa adduct 1:1 | | 93.5 | | 4.35 | | 7.5 | | 9.35 |
| MgO | 2.0 | 2.0 | 2.0 | 2.0 | 1.5 | 1.5 | 1.5 | 1.5 |
| CaO | 1.0 | 1.0 | 1.0 | 1.0 | | | | |
| Addition of stearate | 1.0 | 1.0 | 1.0 | 1.0 | 1.5 | 1.5 | 1.5 | 1.5 |
| Wood flour | 43.4 | 41.15 | 42.55 | 41.5 | | | 14.3 | 13.25 |
| Asbestos flour | 6.0 | 6.0 | 6.0 | 6.0 | 58.0 | 56.2 | | |
| Textile chads | | | | | | | 26.7 | 25.50 |
| Colors | 1.5 | 1.5 | 4.0 | 4.0 | | | 2.0 | 2.0 |
| Total | 100.0 | 100.0 | 100.0 | 100.0 | 100.0 | 100.0 | 100.0 | 100.0 |
| Starting flowability (mm./sec.) | 61/13 | 73/8 | 75/21 | 72/10 | 60/3 | 70/9 | 135/50 | 145/37 |
| Thermal testing without taking into account the heating time: | | | | | | | | |
| 1 hr./110° C | 41/27 | 60/21 | 30/39 | 63/23 | 29/12 | 69/10 | 91/80 | 118/66 |
| 2 hr./110° C | 36/30 | 54/25 | 27/41 | 61/26 | 24/15 | 67/12 | 88/96 | 109/86 |
| 3 hr./110° C | 30/36 | 51/25 | 23/44 | 59/28 | 14/18 | 63/15 | 75/100 | 95/92 |
| Thermal testing taking into account the heating time: | | | | | | | | |
| 25 min./100° C | | | | | | | | |
| 40 min./110° C | | | | | | | | |
| 60 min./110° C | 53/17 | 66/15 | 43/35 | 68/18 | 47/7 | 69/9 | 109/59 | 131/42 |
| 90 min./110° C | 45/21 | 63/18 | 38/37 | 64/21 | 36/9 | 69/10 | 101/72 | 124/54 |
| 120 min./110° C | 41/27 | 60/21 | 30/39 | 63/23 | 29/12 | 69/10 | 91/80 | 118/66 |
| 180 min./110° C | 36/30 | 54/25 | 27/41 | 61/26 | 24/15 | 67/12 | 88/96 | 109/86 |
| 240 min./110° C | 30/36 | 51/25 | 23/44 | 59/28 | 14/18 | 63/15 | 75/100 | 95/92 |

I claim:
1. A process for the manufacture of a phenol formaldehyde resin molding composition capable of rapidly hardening at a molding temperature greater than 120° C. and having good thermal stability and flow characteristics at plasticizing temperatures less than 120° C., comprising intimately blending 100 parts by weight of a phenol formaldehyde resin molding composition with 12 to 19 parts by weight of hexamethylenetetramine monometaborate, rolling said blend and grinding the sheet produced by said rolling.

2. A process comprising:
   (1) preparing an addition product of hexamethylenetetramine monometaborate by reacting hexamethylenetetramine and metaboric acid in a molar ratio of 1:1;
   (2) blending at a blending temperature less than 120° C., an effective amount of said addition product sufficient to accelerate hardening at temperatures greater than 120° C. with a substantially greater amount of novolak phenol formaldehyde resin molding composition free of hexamethylenetetramine added as such, the resulting blend exhibiting good thermal stability and flow characteristics at plasticizing temperatures less than 120° C., and
   (3) subsequently producing a molded article under pressure from said resulting blend at a molding temperature greater than 120° C.

3. The process of claim 2 wherein said blending is carried out at temperatures greater than 70° C. and the blend is cooled and ground to produce a molding powder.

4. The process of claim 2 wherein said molded article is produced by injection molding with screw propulsion.

References Cited

UNITED STATES PATENTS

| | | | |
|---|---|---|---|
| 2,606,888 | 8/1952 | Williams et al. | 260—59 |
| 2,606,889 | 8/1952 | Ward et al. | 260—59 |
| 3,326,843 | 6/1967 | Barnett et al. | 260—38 |

WILLIAM H. SHORT, Primary Examiner

E. WOODBERRY, Assistant Examiner

U.S. Cl. X.R.

260—17.2

PO-1050
(5/69)

UNITED STATES PATENT OFFICE
CERTIFICATE OF CORRECTION

Patent No. 3563952                Dated February 16, 1971

Inventor(s)    Kurt Schmoll

It is certified that error appears in the above-identified patent and that said Letters Patent are hereby corrected as shown below:

Column 4, line 51, "31/1478" should be corrected to read --31/1418--

Column 5, Table II, Hexa adduct - "93.5" should be corrected to read --9.35--

Signed and sealed this 20th day of July 1971.

(SEAL)
Attest:

EDWARD M. FLETCHER, JR.            WILLIAM E. SCHUYLER, JR.
Attesting Officer                  Commissioner of Patents